US007666368B2

(12) United States Patent
Hamano et al.

(10) Patent No.: US 7,666,368 B2
(45) Date of Patent: Feb. 23, 2010

(54) APPARATUS FOR TREATING VOLUME-REDUCED POLYSTYRENE RESIN IN GEL STATE FOR MATERIAL SEPARATION AND RECOVERY

(75) Inventors: Shigenobu Hamano, 1-11, Sukematsu-cho, 1-chome, Izumiotsu-shi, Osaka (JP) 595-0071; Noriomi Hayashi, Yatsushiro (JP)

(73) Assignees: Meishin Kogyo Kabushikigaisha, Kumamoto (JP); Shigenobu Hamano, Osaka (JP)

( * ) Notice: Subject to any disclaimer, the term of this patent is extended or adjusted under 35 U.S.C. 154(b) by 755 days.

(21) Appl. No.: 10/529,482

(22) PCT Filed: Sep. 26, 2003

(86) PCT No.: PCT/JP03/12310

§ 371 (c)(1),
(2), (4) Date: Dec. 19, 2005

(87) PCT Pub. No.: WO2004/029113

PCT Pub. Date: Apr. 8, 2004

(65) Prior Publication Data

US 2006/0148913 A1 Jul. 6, 2006

(30) Foreign Application Priority Data

Sep. 27, 2002 (WO) .................. PCT/JP02/10098
Mar. 5, 2003 (JP) ................... 2003-058003

(51) Int. Cl.
*C08J 11/08* (2006.01)
(52) U.S. Cl. .................. 422/287; 422/288; 422/259; 422/309
(58) Field of Classification Search ............ 422/287, 422/288, 290, 286, 285, 259, 258, 309
See application file for complete search history.

(56) References Cited

U.S. PATENT DOCUMENTS 5,824,709 A * 10/1998 Suka .................. 521/47

(Continued)

FOREIGN PATENT DOCUMENTS

JP 11-77682 A 3/1999

(Continued)

*Primary Examiner*—Elizabeth L McKane
(74) *Attorney, Agent, or Firm*—Sughrue Mion, PLLC (57) ABSTRACT

The invention provides an apparatus for continuously and efficiently treating volume-reduced polystyrene resin in gel state, thereby removing solvent and recovering resin. A volume-reduced gel-state polystyrene resin is heated in the separation/recovery apparatus under ambient pressure or reduced pressure, for removal of solvent and recovery of resin. The apparatus includes an apparatus main unit 10 having at the top of the unit a solvent-recovering section for continuously recovering evaporated solvent and having at the bottom of the unit a resin-recovering section for recovering the solvent-removed resin; a heating medium flow pipe 20 provided inside the apparatus main unit 10 for allowing flow of a heating medium inside the pipe; a gel-state resin-feeding means 14 for feeding the volume-reduced polystyrene resin in gel-state such that the resin is brought into contact with the heating medium flow pipe 20; a resin-holding section 13 provided in the bottom of the apparatus main unit 10 for holding the resin flowed down to the member after contact with the heating medium flow pipe 20; a heating means 25 for heating the resin held in the resin-holding section 13; and a stirring means 26 for stirring the resin contained in the resin-holding section.

12 Claims, 7 Drawing Sheets

U.S. PATENT DOCUMENTS

2004/0152816 A1 * 8/2004 Nakajima et al. ........... 524/386

FOREIGN PATENT DOCUMENTS

| | | |
|---|---|---|
| JP | 2000-80198 A | 3/2000 |
| JP | 2000-189924 A | 7/2000 |
| JP | 2001-181439 A | 7/2001 |
| JP | 2001-310971 A | 11/2001 |
| JP | 2002-128948 A | 5/2002 |
| JP | 2002-338731 A | 11/2002 |
| JP | 2002-348404 A | 12/2002 |
| JP | 2003-064216 A | 3/2003 |

* cited by examiner

APPARATUS FOR TREATING VOLUME-REDUCED POLYSTYRENE RESIN IN GEL STATE FOR MATERIAL SEPARATION AND RECOVERY

TECHNICAL FIELD

The present invention relates to a technique for recovering liquid (solvent) and resin from volume-reduced polystyrene resin in a gel state (hereinafter the resin is referred to as volume-reduced gel-state polystyrene resin). More particularly, the invention relates to an apparatus for continuously treating volume-reduced gel-state polystyrene resin to thereby remove solvent and recover resin.

BACKGROUND ART

Recently, techniques for treating waste resin materials such as waste polystyrene resin and polystyrene foam, having an apparent volume larger than the actual solid (resin component) volume, have been developed (see, for example, Japanese Patent Application Laid-Open (kokai) Nos. 2-1748, 5-59212, 7-113089, 9-40802, and 9-157435, 2001-181439). According to these techniques, waste resin material is brought into contact with a solvent to form a gel, whereby the volume of the waste resin material is reduced to a volume almost equivalent to the actual volume. Then, the resin is separated from the solvent and reused as a fuel or a resin raw material, while the solvent is reused as a solvent for the volume reduction treatment.

In one procedure proposed in the above, relatively new technical field, resin (solid) and solvent (liquid) are separated from a gel product through evaporation of the solvent to thereby yield a solid, and condensing the vapor to recover the solvent. Generally, the treatment in which waste resin material is brought into contact with a solvent to form a gel, whereby the volume of the waste resin material is reduced to a volume almost equivalent to the actual volume, is referred to as volume-reduction gelling or simply as volume reduction. The resin that has been gelled to gelatinous solid or gel is called volume-reduced gel-state polystyrene resin. Two methods have been proposed for separating resin and solvent from volume-reduced gel-state polystyrene resin. One method includes evaporating solvent of the volume-reduced gel-state polystyrene resin, and the other method includes pressing the volume-reduced gel-state polystyrene resin to thereby separate the solvent. In the latter method, a very small amount of solvent remains in the resin, and the solvent is further evaporated in accordance with needs.

In general, liquid (solvent) is evaporated by heating the liquid (solvent), and the liquid (solvent) is recovered by condensing the vapor thereof. Similarly, solvent contained-in-volume-reduced gel-state polystyrene resin or in a resin that is produced by removing solvent through pressing from volume-reduced gel-state polystyrene resin is evaporated through heating.

Japanese Patent Application Laid-Open (kokai) No. 2001-181439 discloses a polystyrene-recovering apparatus including a dissolving tank for forming a liquid by adding a solvent to a gel containing polystyrene in solvent; a filter for filtering the liquid; a condenser for evaporating the solvent contained in the liquid that has passed through the filter, thereby forming a concentrate-having a predetermined concentration; and a separator for evaporating the solvent contained in the concentrate, thereby recovering polystyrene. The separator of the apparatus is a thin-layer-evaporation separator 90 composed of a double vessel including a separator inner cylinder 91 and a separator outer cylinder 92. In the separator, a heating medium for heating is circulated in the space between the inner cylinder 91 and the outer cylinder 92, and the concentrate is supplied through the inner cylinder 92. In this case, the concentrate flows down through the inner cylinder 92 while the solvent contained in the concentrate is gradually evaporated. In order to ensure smooth flow which would otherwise be prevented by an increase in resin concentration, a plurality of scraping plates 97 are provided surrounding a rotation axis 95 by the mediation of rotation arms 96 so that the resin adhering on the inner cylinder 92 is scraped.

However, the aforementioned conventional resin/solvent separator, which, by heating, evaporates the solvent contained in volume-reduced gel-state polystyrene resin fed to the apparatus main unit and flowing down in the apparatus, attains poor solvent removal efficiency, raising the problem that the solvent is not sufficiently removed, resulting in poor treatment efficiency. In addition, resin quality after removal of solvent is unsatisfactory. When such resin is extruded to form pellets, undesired cutting occurs due to air bubbles remaining in the resin, which is problematic.

Japanese Patent Application Laid-Open (kokai) No. 2001-310971 discloses an apparatus for separating and recovering styrene and ester-based vegetable oil from a mixture containing volume-reduced water styrene foam and ester-based vegetable oil. The apparatus has a double-wall cylindrical tank 11 which can be maintained at a predetermined temperature and which includes therein a plurality of stages of warming beds 12 in the vertical direction for maintaining the temperature equivalent to the temperature inside the cylindrical tank 11. Each warming bed contains concentrically arranged warming pipes 121 at small intervals. In the apparatus, when the above mixture is spouted out onto the uppermost warming bed 12 of the warming beds 12 provided in the vertical direction, the mixture is then spouted out by means of a roller 131 from the cavity among the warming pipes 121 onto the warming pipes 121 of the subsequent warming bed 12. Since the mixture is heated through the warming pipes 121, ester-based vegetable oil is evaporated. Through repetition of the above process, the mixture is separated into the ester-based vegetable oil and waste styrene foam.

Through employment of the above apparatus, the mixture can be relatively sufficiently separated into resin and solvent. However, since the ester-based vegetable oil and waste styrene foam is obtained from the mixture by subjecting the mixture to the heating step a plurality of times, the separation operation becomes cumbersome and requires a long period of time, thereby lowering operation efficiency, which is problematic.

DISCLOSURE OF THE INVENTION

In view of the foregoing, an object of the present invention is to provide an apparatus for continuously and efficiently treating volume-reduced gel-state polystyrene resin to thereby remove solvent and recover resin (hereinafter the "apparatus for treating volume-reduced gel-state polystyrene resin to thereby remove solvent and recover resin" is referred to simply as "separation/recovery apparatus").

To attain the aforementioned object, in a first mode of the present invention, there is provided a separation/recovery apparatus for heating volume-reduced gel-state polystyrene resin under ambient pressure or reduced pressure, to thereby remove solvent and recover resin, characterized in that the apparatus comprises:

an apparatus main unit having at the top of the unit a solvent-recovering section for continuously recovering evaporated solvent and having at the bottom of the unit a resin-recovering section for recovering the solvent-removed resin;

a heating medium flow pipe which is provided inside the apparatus main unit such that the pipe forms a multi-layer structure in the vertical direction and which allows flow of a heating medium inside the pipe;

a gel-state resin-feeding means for feeding the volume-reduced gel-state polystyrene resin such that the resin is brought into contact with the heating medium flow pipe;

a resin-holding section provided in the bottom of the apparatus main unit for holding the resin which has flowed down to the member after contact with the heating medium flow pipe;

a heating means for heating the resin held in the resin-holding section;

a stirring means for stirring the resin contained in the resin-holding section; and regulating plates for guiding flow of the volume-reduced gel-state polystyrene resin which flows while being in contact with the heating medium flow pipe, the regulating plates being provided in the vicinity of and along the heating medium flow pipe, with a predetermined spacing between the plates.

According to the first mode, resin and solvent can individually be separated and recovered from volume-reduced gel-state polystyrene resin, while volume-reduced gel-state polystyrene resin is continuously fed to the apparatus, leading to remarkable enhancement of treatment efficiency. In addition, volume-reduced gel-state polystyrene resin flows down from the heating medium flow pipe to a lower section of the pipe without failure by the mediation of flow-regulating plates.

A second mode of the present invention is drawn to a specific embodiment of the apparatus of the first mode, wherein the heating medium flow pipe is provided in a continuous helical manner in the apparatus main unit in the vicinity of the circumferential wall.

According to the second mode, volume-reduced gel-state polystyrene resin is heated through contact with the heating medium flow pipe, and solvent contained in the volume-reduced gel-state polystyrene resin is effectively separated and removed.

A third mode of the present invention is drawn to a specific embodiment of the apparatus of the first or second mode, wherein the volume-reduced gel-state polystyrene resin which has been in contact with the heating medium flow pipe flows through the heating medium flow pipe and flows down from an upper section of the heating medium flow pipe to a lower section thereof, whereby the resin is transferred to the resin-holding section.

According to the third mode, volume-reduced gel-state polystyrene resin is caused to be contact with the heating medium flow pipe for a long period of time, and solvent contained in the volume-reduced gel-state polystyrene resin can be effectively and reliably removed.

A fourth mode of the present invention is drawn to a specific embodiment of the apparatus of any of the first to third modes, wherein the flow-regulating plates are provided in the lateral sides of the heating medium flow pipe with a predetermined spacing and are caused to be slanted such that the lower opening has a spacing narrower than that of the upper opening.

According to the fourth mode, flow of volume-reduced gel-state polystyrene resin is guided by the flow-regulating plates, and volume-reduced gel-state polystyrene resin flows down to the lower heating medium flow pipe through the space between the plates.

A fifth mode of the present invention is drawn to a specific embodiment of the apparatus of the fourth mode, wherein the flow-regulating plates are provided so as to form a multi-layer structure in the vertical direction, the upper spacing increases in the vertical direction from the top to the bottom of the multi-layers, and the volume-reduced gel-state polystyrene resin spilling over the upper ends of the flow-regulating plates flows down to the flow-regulating plates of a lower layer.

According to the fifth mode, even when the volume-reduced gel-state polystyrene resin spills over the upper ends of the regulating plates and flows down, the volume-reduced gel-state polystyrene resin flows down onto the lower heating medium flow pipe without fail.

A sixth mode of the present invention is drawn to a specific embodiment of the apparatus of any of the first to fifth modes, wherein the flow-regulating plates provided along the heating medium flow pipe forming the lowermost layer guide the resin which has flowed down from the heating medium flow pipe to the wall of the apparatus main unit.

According to the sixth mode, the resin flowing down from the heating medium flow pipe is poured into the resin-holding section through the inner wall of the apparatus main unit which is heated by the heating means. Therefore, solidification of the resin is prevented, reliably maintaining fluidity.

A seventh mode of the present invention is drawn to a specific embodiment of the apparatus of any of the first to sixth modes, wherein the heating means includes a heating medium circulation means for circulating a heating medium over the wall of the lower section of the apparatus main unit.

According to the seventh mode, fluidity of the resin flowing through the inner wall of the apparatus main unit can be more reliably maintained.

An eighth mode of the present invention is drawn to a specific embodiment of the apparatus of the seventh mode, wherein the heating, medium circulation means is linked to the heating medium flow pipe, whereby the heating medium is continuously circulated throughout the heating medium circulation means and the heating medium flow pipe.

According the eighth mode, the heating media can be effectively utilized.

A ninth mode of the present invention is drawn to a specific embodiment of the apparatus of any of the first to eighth modes, wherein the inner surface of the resin-holding section is maintained at a temperature higher than the surface temperature of the heating medium circulating means.

According the ninth mode, ignition which would otherwise be caused by a high temperature at which the top of the apparatus main unit is maintained can be prevented, and fluidity of the resin present in the bottom of the apparatus main unit can be maintained.

A tenth mode of the present invention is drawn to a specific embodiment of the apparatus of any of the first to ninth modes, wherein the heating means includes a heating medium circulation device which is in the general form of a hollow cylinder and which is provided surrounding the stirring means disposed virtually at the center of the bottom of the resin-holding section.

According to the tenth mode, since the resin held in the resin-holding section is reliably maintained at a predetermined heated temperature, solidification of the resin is prevented, and virtually all of the solvent contained in the resin can be removed.

An eleventh mode of the present invention is drawn to a specific embodiment of the apparatus of any of the first to tenth modes, wherein the gel-state resin-feeding means includes a trough member which is provided above the heating medium flow pipe and which is rotatably operated, and a conduit for feeding the volume-reduced gel-state polystyrene resin onto the trough member, such that the volume-reduced gel-state polystyrene resin that has spilt over the trough member is caused to flow down to the heating medium flow pipe.

According to the eleventh mode, volume-reduced gel-state polystyrene resin is caused to flow down almost uniformly in amount from the trough member to the heating medium pipe along the entire circumference of the apparatus main body.

A twelfth mode of the present invention is drawn to a specific embodiment of the apparatus of any of the first to eleventh modes, wherein the apparatus further includes a transfer pipe for transferring the resin discharged down from the resin-recovering section in a generally horizontal direction, and a discharge pump attached to the transfer pipe for recovering the resin.

According to the twelfth mode, the resin discharged from the resin-recovering section flows through the transfer pipe to the discharge pump. Therefore, air bubbles contained in the resin are remarkably reduced.

A thirteenth mode of the present invention is drawn to a specific embodiment of the apparatus of the twelfth mode, wherein the apparatus further includes a heating means for heating around the transfer pipe.

According to the thirteenth mode, the resin flowing through the transfer pipe is heated, thereby maintaining fluidity of the resin.

BEST MODES FOR CARRYING OUT THE INVENTION

Embodiments of the present invention will next be described in detail.

Embodiment 1

Figure 1:
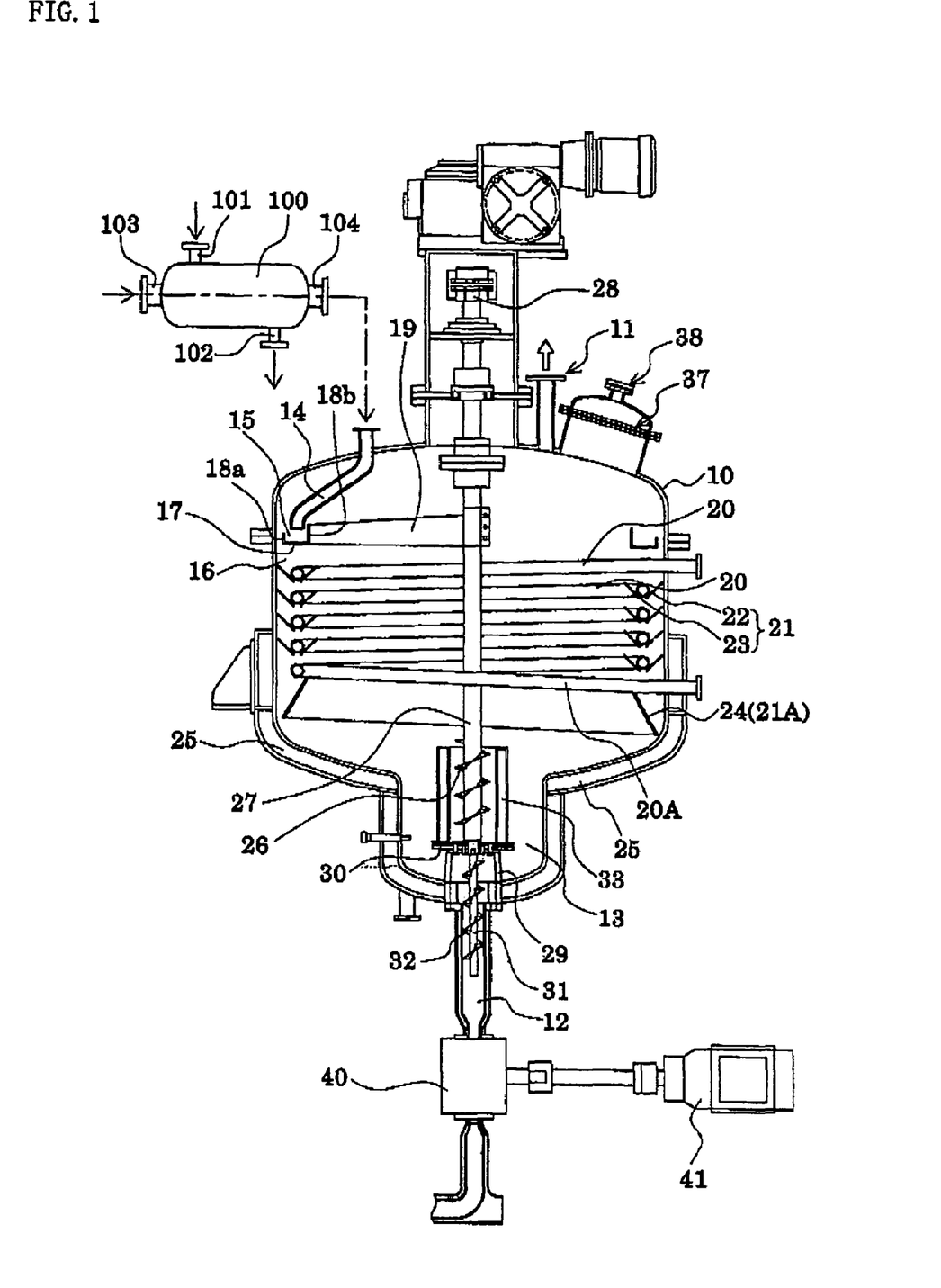
FIG. 1 is a schematic view of a separation/recovery apparatus according to Embodiment 1 of the present invention.
Figure 2:
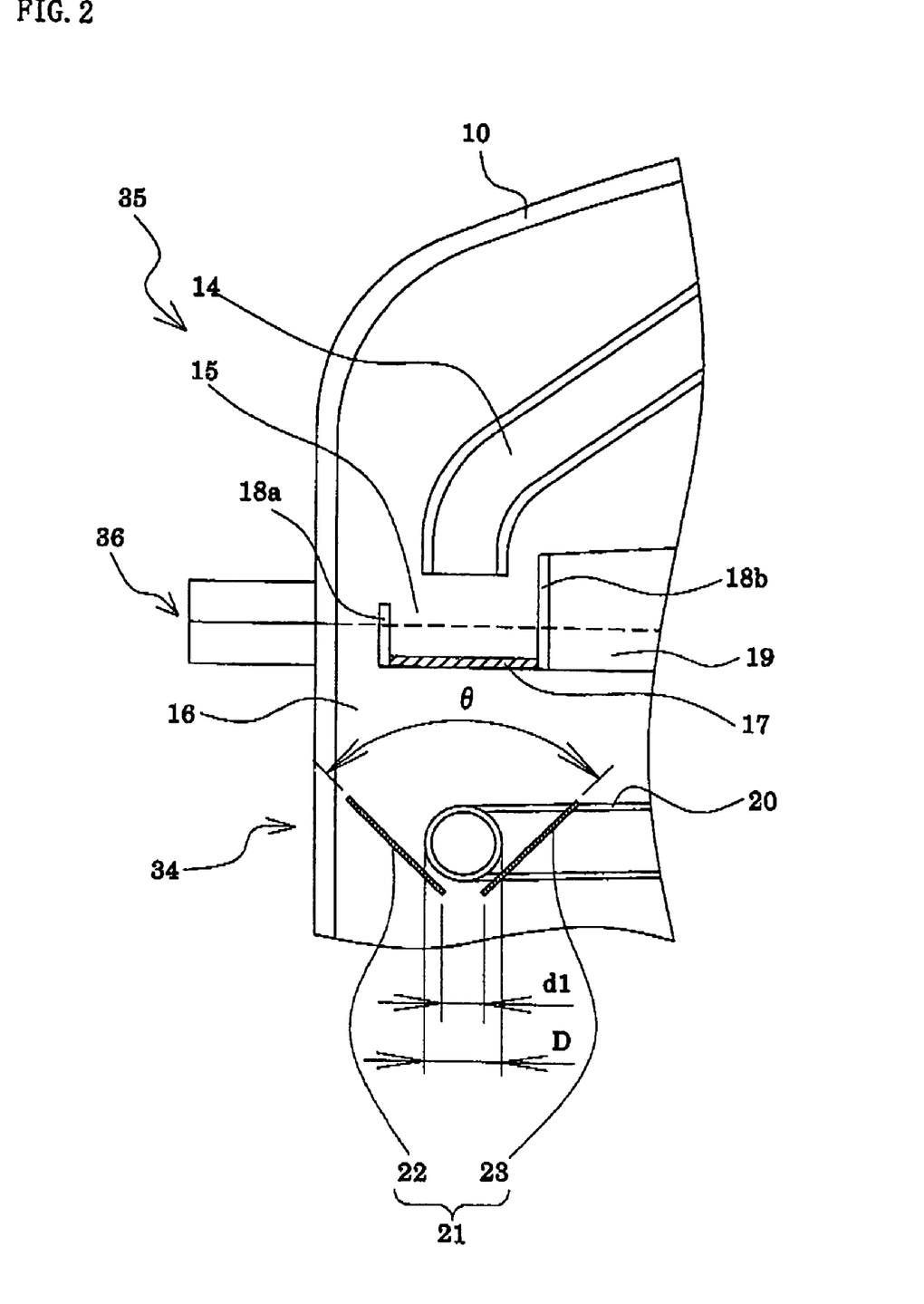
FIG. 2 is an enlarged view of a portion of the separation/recovery apparatus according to Embodiment 1 of the present invention.

FIG. 1 is a schematic view of a separation/recovery apparatus according to Embodiment 1 of the present invention, and FIG. 2 is an enlarged view of a portion of the separation/recovery apparatus according to Embodiment 1 of the present invention.

The separation/recover apparatus of Embodiment 1, provided for heating volume-reduced gel-state polystyrene resin under reduced pressure, thereby separating and recovering solvent and resin, has an apparatus main unit 10 of a generally hollow cylindrical shape; a solvent-recovering section 11 for continuously recovering evaporated solvent at the top of the main unit 10; and a resin-recovering section 12 for recovering the solvent-removed resin at the bottom of the main unit 10.

The bottom of the apparatus main unit 10 has an outer diameter smaller than that of the top and serves as a resin-holding section 13 (hereafter described in detail) for holding the resin obtained through removal of solvent from volume-reduced gel-state polystyrene resin. The resin-recovering section 12 is connected to the resin-holding section 13.

The solvent-recovering section 11 is connected to a condenser and discharge pipes (not illustrated) connected to a recovering tank or other members. Through continuous evacuation via the discharge pipes, the inside of the apparatus main unit 10 maintains reduced pressure.

Feeding means for feeding volume-reduced gel-state polystyrene resin into the apparatus main unit 10 is provided at the top of the apparatus main unit 10. In Embodiment 1, the feeding means includes a conduit 14 and a trough member 16, the conduit 14 being secured through the upper wall of the apparatus main unit 10 and being provided for feeding from the outside volume-reduced gel-state polystyrene resin to the apparatus main unit 10, and the trough member 16 being provided at the top of the apparatus main unit 10 and having a gutter 15 for accumulating a predetermined amount of volume-reduced gel-state polystyrene resin fed through the conduit 14.

The trough member 16 is provided in the vicinity of the inner wall of the apparatus main unit 10 in a circumferential direction. A bottom 17 defining the gutter 15 is composed of, for example, a gold mesh (about 8 mesh), and the gutter includes an outer wall 18a having a height lower than that of an inner wall 18b. The trough member 16 is secured to the below-mentioned stirring rod via a supporting member 19, and the trough member 16 is rotated through rotation of the stirring rod.

Under the trough member 16, a heating medium flow pipe 20 is provided along the inner wall of the apparatus main unit 10 in a continuous helical manner so as to form a multi-layer structure in the vertical direction. Each of the ends of the heating medium flow pipe 20 communicates with the outside through the side of the apparatus main unit 10. A heating medium such as heating oil or steam is fed into the heating medium flow pipe 20 through one end, while the heating medium is discharged to the outside through the other end. In other words, a heating medium is continuously circulated inside the heating medium flow pipe 20 so as to maintain the surface of the heating medium flow pipe 20 at a predetermined temperature. In general, preferably, when heating oil is used as a heating medium, the medium is introduced through the lower end, whereas when steam is used as a heating medium, the medium is introduced through the upper end. In Embodiment 1, heating oil is introduced through the lower end.

In Embodiment 1, the heating medium flow pipe 20 is provided in a continuous helical manner so as to form a multi-layer structure in the vertical direction. However, no particular limitation is imposed on the configuration, and a plurality of individual heating medium flow pipes may be provided so as to form a multi-layer structure in the vertical direction.

Under the heating medium flow pipe 20, a flow-regulating member 21 for guiding the flow of volume-reduced gel-state polystyrene resin is provided along the heating medium flow pipe 20. As described above, the heating medium flow pipe 20 is provided in a continuous helical manner so as to form a multi-layer structure in the vertical direction. Accordingly, the flow-regulating member 21 is provided also in a continuous helical manner so as to form a multi-layer structure in the vertical direction. The flow-regulating member 21 is basically composed of two regulating plates 22 and 23. These regulating plates 22 and 23 are provided in the lateral sides of the heating medium flow pipe 20 with a predetermined spacing. The plates are caused to be slanted such that the lower opening has a spacing narrower than that of the upper opening. In Embodiment 1, two regulating plates 22 and 23 are disposed such that the two plates form an angle θ of about 90°. Preferably, the two regulating plates 22 and 23 are disposed such that the spacing d1 at the lower end is narrower than the outer diameter D of the heating medium flow pipe 20. For example, in Embodiment 1, the heating medium flow pipe 20 has an outer diameter of 40 mm, while the spacing between the regulating plates 22 and 23 at the lower end is 30 mm (see FIG. 2).

The regulating plates 22 and 23 are not necessarily provided over the entire region of the heating medium flow pipe 20, so long as the plates are provided along the pipe. Thus, the regulating plates 22 and 23 may be provided intermittently along the pipe. In the case where the regulating plates are each continuously provided, a plurality of segmental members having predetermined dimensions may be appropriately provided.

Under the heating medium flow pipe 20A forming the lowermost layer, another flow-regulating member 21A is provided. The flow-regulating member 21A is composed of, instead of two regulating plates, a lampshade-like member 24 having a slanted surface extending from a region corresponding to the lower side of the heating medium flow pipe 20A to a region close to the side inner wall of the apparatus main unit.

On the outer surface of the apparatus main unit 10 corresponding to the region from the heating medium flow pipe 20A serving forming the lowermost layer to the resin-holding section 13, a heating means is provided in a continuous manner. No particular limitation is imposed on the type of the heating means, and any heating means may be employed, so long as it can heat the side wall of the apparatus main unit 10. In Embodiment 1, similar to the heating medium flow pipe 20, the heating means is a heating medium circulation means 25 in which a specific heating medium is circulated. Different types of heating media may be circulated in the heating medium circulation means 25 and the heating medium flow pipe 20, respectively. Alternatively, the heating medium circulation means 25 and the heating medium flow pipe 20 may be linked together, whereby a heating medium is continuously circulated throughout the heating medium circulation means 25 and the heating medium flow pipe 20. Through employment of the latter, a heating medium can be effectively utilized, thereby reducing energy cost.

At the center of the resin-holding section 13, a stirring means for stirring the resin held in the resin-holding section 13 is provided. In Embodiment 1, a stirring rod 27 having a protruding portion 26 formed thereon is provided in a helical manner in a region corresponding to the resin-holding section 13. The stirring rod 27 is connected at one end thereof to a driving motor 28 provided at the top of the apparatus main unit 10, and rotatably held at the other end thereof with a support base 30 that is secured on the bottom of the apparatus main unit 10 by the mediation of a plurality of (e.g., 4) legs 29.

In Embodiment 1, a second stirring rod 31 extends inside the resin-recovering section 12 linked to the bottom of the apparatus main unit 10, and is connected to the end of the stirring rod 27 which is held by the support base 30. Through rotation of the stirring rod 27, the second stirring rod 31 is simultaneously rotated. Similar to the stirring rod 27, the second stirring rod 31 has a protruding portion 32. When the stirring rod 27 and the second stirring rod 31 are rotated, the resin held in the resin-holding section 13 is stirred and is caused to flow into the resin-recovering section 12.

As also described above, the trough member 16 is secured to the top of the stirring rod 27 via the supporting member 19. When the stirring rod 27 and the second stirring rod 31 are rotated, the trough member 16 is also rotated.

A heating medium circulation device 33 which is in the general form of a hollow cylinder and in which a heating medium is circulated is provided surrounding the stirring rod 27. The heating medium circulation device 33 is secured on the support base 30 that holds the end of the stirring rod 27. Although the details are described hereafter, the heating medium circulation device 33 is provided so as to heat the resin held in the resin-holding section 13.

In Embodiment 1, a preheater 100 is connected to the conduit 14 for feeding volume-reduced gel-state polystyrene resin. The preheater 100 (e.g., a multi-stage heat-exchanger) has a heating medium inlet 101 through which a heating medium such as steam is fed, and a heating medium outlet 102. The volume-reduced gel-state polystyrene resin fed through a raw material inlet 103 is preliminary heated by the preheater, and the thus-heated volume-reduced gel-state polystyrene resin is discharged through a raw material outlet 104.

According to the separation/recovery apparatus of Embodiment 1, volume-reduced gel-state polystyrene resin can be efficiently separated into resin and solvent, which can be separately recovered. Hereinafter, the procedure of separating volume-reduced gel-state polystyrene resin for recovering resin and solvent will be described with reference to FIGS. 3 and 4.

As used herein, the term "volume-reduced gel-state polystyrene resin" refers to a gel-state product obtained through bringing a waste of polystyrene resin, polystyrene foam, etc. having an apparent volume larger than the true resin volume into contact with a solvent. No particular-limitation is imposed on the type of solvent treatment of volume-reduced gel-state polystyrene resin. In Embodiment 1, polystyrene resin or polystyrene foam is treated with a solvent having a flash point of about 40° C. to 100° C. and an ignition point of about 180° C. to 350° C. No particular limitation is imposed on the solvent for use in treatment, and a mixture, of glycol ether (particularly glycol diether compounds, glycol ether fatty acid alkyl ester compounds, etc.) and a gelling coagulant such as higher fatty acid or higher alcohol (particularly aliphatic hydrocarbon) may be used.

Preferably, the volume-reduced gel-state polystyrene resin fed to the preheater 100 is fluidized to a certain degree, and impurities such as dust are filtered out in accordance with needs. When such volume-reduced gel-state polystyrene resin is preliminary heated to, for example, about 150° C. by use of the preheater 100 in accordance with needs, followed by feeding to the conduit 14, a low-boiling-point component immediately evaporates under reduced pressure in the apparatus main unit 10 and is recovered by the solvent-recovering section 11.

According to Embodiment 1, when a solvent having an ignition point lower than the inside temperature of the apparatus main unit 10 is used for the treatment, the solvent is preliminary heated by use of the preheater 100 such that a low-boiling-point component contained in the solvent is removed immediately after introduction to the apparatus. In contrast, when a solvent having comparatively high boiling point is used for the treatment, the preheater 100 is not operated. Provision of the preheater 100 is not essential, and the volume-reduced gel-state polystyrene resin having a certain level of fluidity may be fed directly into the conduit 14.

Figure 3:
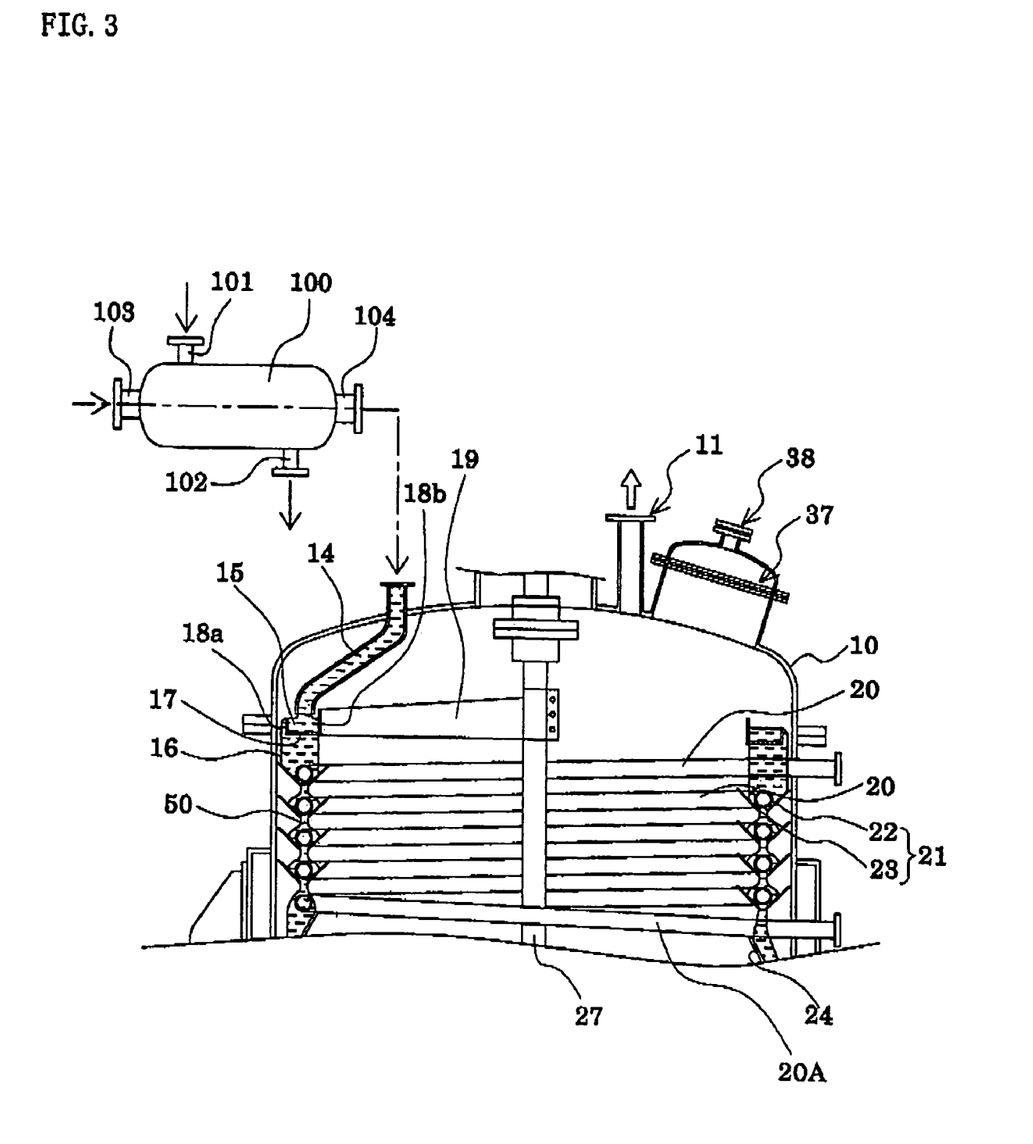
FIG. 3 is a schematic view showing the separation/recovery procedure by use of the separation/recovery apparatus according to Embodiment 1 of the present invention.

As shown in FIG. 3, when the volume-reduced gel-state polystyrene resin 50 is introduced through the conduit 14 to the apparatus main unit 10, the volume-reduced gel-state polystyrene resin 50 is poured into the gutter 15 of the trough member 16 secured to the stirring rod 27. Since the trough member 16 is rotated with the stirring rod 27, the volume-reduced gel-state polystyrene resin 50 is poured almost uniformly into the gutter 15 of the trough member 16 along the entire circumference of the apparatus main body.

Then, the volume-reduced gel-state polystyrene resin 50 which has been poured into the gutter 15 is moved on the metal mesh forming the bottom surface 17, and a portion of the polystyrene resin falls through the metal mesh down to the heating medium flow pipe 20 while the flow speed of the resin is reduced. When a predetermined amount of the volume-reduced gel-state polystyrene resin 5b has been accumulated in the gutter 15, the volume-reduced gel-state polystyrene resin 50 eventually spills over the gutter 15 and flows down to the heating medium flow pipe 20. Since, as described above, the outer wall 18a of the gutter 15 has a height lower than that of the inner wall 18b, the volume-reduced gel-state polystyrene resin 50 spilt over the gutter 15 flows through the outer surface of the trough member 16 and flows down to the uppermost heating medium flow pipe 20 from the bottom of the trough member.

Figure 5:
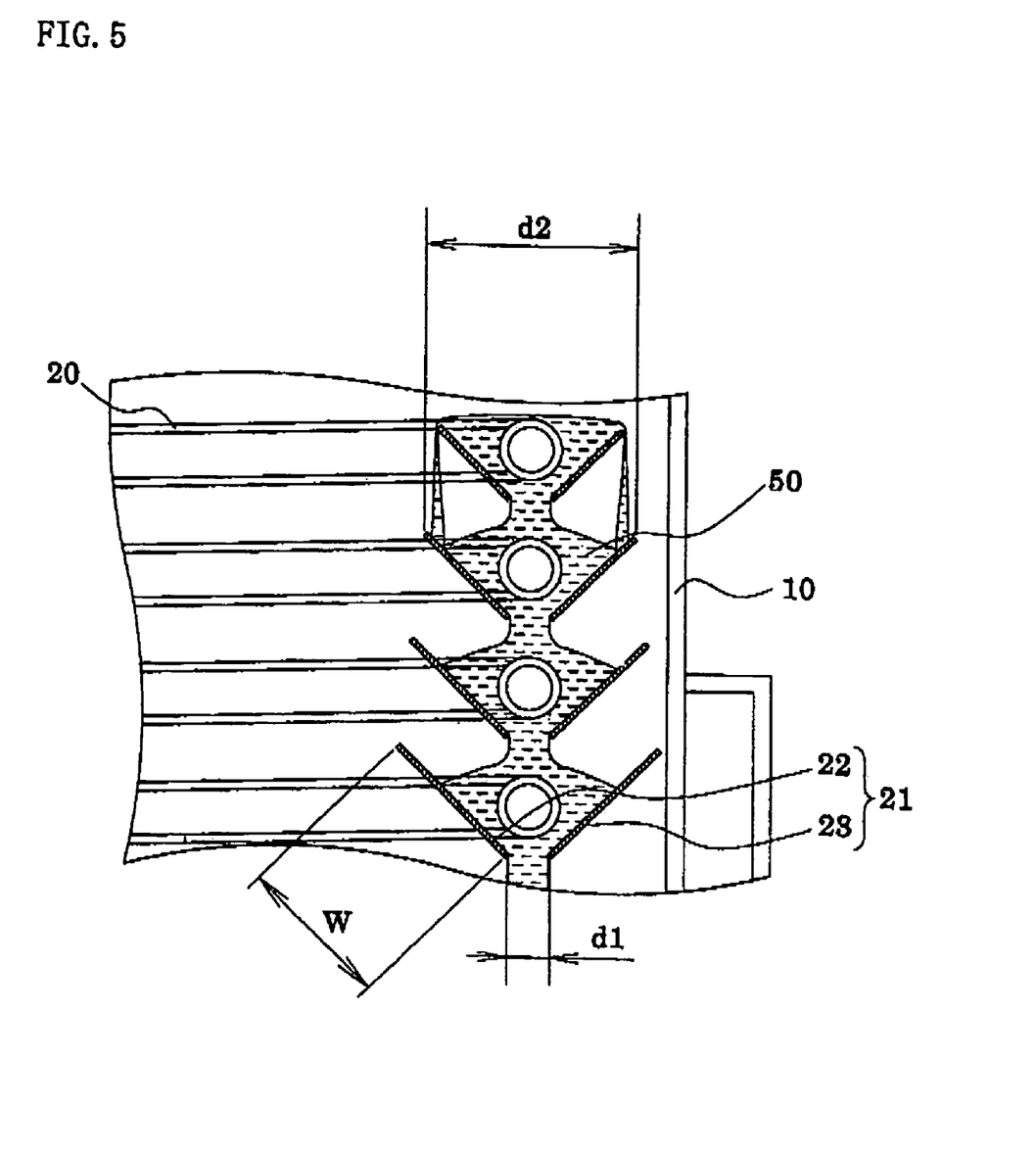
FIG. 5 is a sketch of an example of a modified flow-regulating member according to Embodiment 1 of the present invention.

The flow of the volume-reduced gel-state polystyrene resin 50 flowing down from the uppermost heating medium flow pipe 20 is controlled by the flow-regulating member 21 composed of the two regulating plates 22 and 23, whereby the volume-reduced gel-state polystyrene resin sequentially flows down to the heating medium flow pipe 20 disposed thereunder. In Embodiment 1, the regulating plates 22 and 23 are provided such that the spacing between the two plates at the upper end is almost constant in the vertical direction. However, as shown in FIG. 5, the width W of the regulating plates 22 and 23 may be gradually increased in the vertical direction from the top to the bottom, whereby the spacing d2 at the upper end of the regulating plates 22 and 23 gradually increases in the vertical direction from the top to the bottom (i.e., the regulating plates 22 and 23 forming a lower layer protrude further outward). Through employment of the above configuration, even when the volume-reduced gel-state polystyrene resin 50 spills over the upper ends of the regulating plates 22 and 23 and flows down, the volume-reduced gel-state polystyrene resin 50 flows down onto the lower regulating plates 22 and 23 without failure, whereby the resin flows down while being successively in contact with the lower heating medium flow pipe 20. In the configuration shown in FIG. 5, the regulating plates 22 and 23 forming a lower layer are caused to protrude further outward through appropriately providing regulating plates 22 and 23 having different widths W. Needless to say, alternatively, the regulating plates 22 and 23 forming a lower layer may be caused to protrude further outward by increasing the slant angles of the regulating plates, the spacing d1 of the lower end, or the spacing d2 at the upper end, in the vertical direction from the top to the bottom.

In Embodiment 1, heating oil serving as a heating medium is introduced to the heating medium flow pipe 20, and therefore, the outer surface of the heating medium flow pipe 20 is maintained at about 180° C. to 200° C. Thus, volume-reduced gel-state polystyrene resin 50 which has flowed down to the heating medium flow pipe 20 is heated, whereby a portion of solvent is evaporated and removed. In Embodiment 1, since the heating medium flow pipe 20 is provided so as to form a multi-layer structure, volume-reduced gel-state polystyrene resin 50 is repeatedly heated, whereby most of the solvent is evaporated and removed. In other words, when the volume-reduced gel-state polystyrene resin 50 flows along the heating medium flow pipe 20 and flows down from the pipe, virtually all of the solvent is removed, and solvent-removed resin is obtained.

Meanwhile, the thus-vaporized solvent is discharged from the apparatus main unit 10 to the outside through the solvent-recovering section 11. As described above, since the inside of the apparatus main unit 10 maintains reduced pressure conditions through evacuation through an evacuation pipe connected to the solvent-recovering section 11, the vaporized solvent is successively discharged through the solvent-recovering section 11. The discharged solvent is liquefied by means of a condenser (not illustrated) and recovered in a recovering tank.

Figure 4:
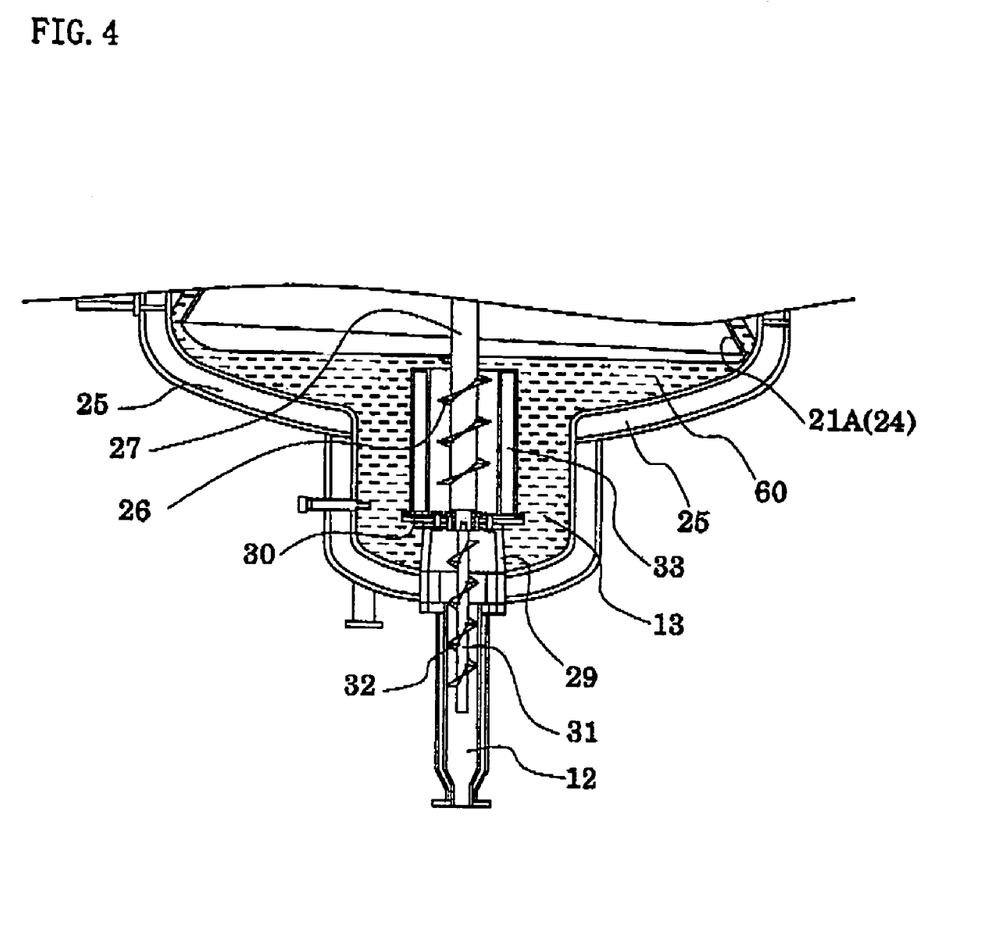
FIG. 4 is a schematic view showing the separation/recovery procedure by use of the separation/recovery apparatus according to Embodiment 1 of the present invention.

As shown in FIG. 4, the resin 60 from which solvent has been removed through repeated heating by the heating medium flow pipe 20 flows down from the heating medium flow pipe 20A forming the lowermost layer, and flows into the resin-holding section 13 along the inner surface of the apparatus main unit 10 by the mediation of the flow-regulating member 21A (24).

On the outer surface of the apparatus main unit 10 corresponding to the bottom (i.e., the region from the flow-regulating member 21A (24) to the resin-holding section 13), the heating medium circulation means 25 serving as the aforementioned heating means is provided, whereby the wall of the apparatus main unit 10 is maintained at, for example, about 230° C. Thus, the resin 60 that flows down from the flow-regulating member 21A to the inner surface of the apparatus main unit 10 is further heated to become less viscous and to have sufficient fluidity. Therefore, the resin smoothly flows down to the resin-holding section 13 through the inner surface of the apparatus main unit 10.

The resin 60 that has flowed down to and been held in the resin-holding section 13 is stirred through rotation of the stirring rod 27 having the protruding portion 26 and the second stirring rod 31 having the protruding portion 32, and is sufficiently heated by means of the heating medium circulation means 25 and the heating medium circulation device 33. Thus, the solvent remaining in the resin 60 is thoroughly vaporized, and air (air bubbles) contained in the resin is removed. At that moment, solvent and air bubbles are virtually completely removed from the resin 60 held in the resin-holding section 13.

In this embodiment, the heating medium circulation means 25 serving as a heating means is provided exclusively on the outer surface of the bottom of the apparatus main unit 10, and the bottom of the apparatus main unit 10 including the resin-holding section 13 is maintained at a temperature higher than that of the aforementioned heating medium flow pipe 20. Therefore, ignition which would otherwise be caused by high temperature at which the top of the apparatus main unit 10 is maintained can be prevented, and the fluidity of the resin 60 held in the bottom of the apparatus main unit 10 is maintained.

The reduced pressure conditions inside the apparatus main unit 10 can be maintained through provision of the resin-holding section 13 for holding the resin 60 and the resin-recovering section 12 which is provided under and connected to the resin-holding section and in communication with the outside and through the resin 60 held in the resin-holding section 13.

According to the present invention, in order to consistently and reliably maintain reduced pressure conditions inside the apparatus main unit 10, the resin-holding section 13 has a hollow cylindrical shape having a diameter which is smaller than that of the apparatus main unit 10 and which is uniform in the vertical direction. Thus, even when a small amount of resin 60 is held in the resin-holding section 13, a sufficient height of the resin 60 in the section is maintained. Therefore, undesired communication with the outside via the resin-re-covering section 12 can be reliably inhibited.

The resin 60 held in the resin-holding section 13 is continuously transferred to the resin-recovering section 12 by means of, for example, a suction means (not illustrated) such as a gear pump for transferring molten plastic connected to the resin-recovering section 12, while the flow of the resin is guided by the protruding portion 32 of the second stirring rod 31.

More specifically, the protruding portion 32 provided on the second stirring rod 31 in a helical manner has a diameter (as viewed in the plan view projection) which is almost equal to the diameter of the opening of the resin-recovering section 12 on the apparatus main unit 10 side. Therefore, the resin held in the resin-holding section 13 is continuously transferred to the resin-recovering section 12 by a predetermined amount through rotation of the second stirring rod 31 while the flow of the resin is guided by the protruding portion 32.

The resin that has flowed to the resin-recovering member 12 is transferred to an extruder (not illustrated) by means of a discharge pump 40 and a drive motor 41 provided under the resin-recovering member (see FIG. 1). The resin is heated at a predetermined temperature and extruded through a die, thereby molding the resin into rod members having a predetermined diameter. Notably, when solvent, air bubbles, etc. remain in the resin, cracks and similar breakages tend to occur during molding the resin into rod members. According to the separation/recovery apparatus of the present invention, solvent-removed resin is sufficiently heated in the resin-holding section 13, and solvent, air bubbles, etc. are completely removed from the resin. Therefore, cracks and similar breakages during molding can be prevented. The discharge pump 40 for transferring resin must be appropriately selected, since use of a certain type of the discharge pump causes incorporation of air bubbles into the resin.

The temperature at which the resin is extruded through a die of the extruder is preferably controlled such that the temperature falls within an appropriate range lower than the temperature of the resin-holding section 13. When the die temperature is excessively high, rod members having a predetermined thickness cannot be produced, due to excessively high viscosity of the resin, whereas when the die temperature is excessively low, cracks and other breakages of rod members may occur, due to excessively high extrusion pressure. The appropriate die temperature in Embodiment 1, which depends on the type of the resin, is preferably about 200° C. or lower.

Through control of the temperatures of the resin-holding section 13 and the die, a resin having an optimum viscosity is extruded at appropriate pressure, thereby forming rod members. Thus, the rod members have a predetermined diameter, and cracks and other breakages can be prevented more reliably.

Figure 6:
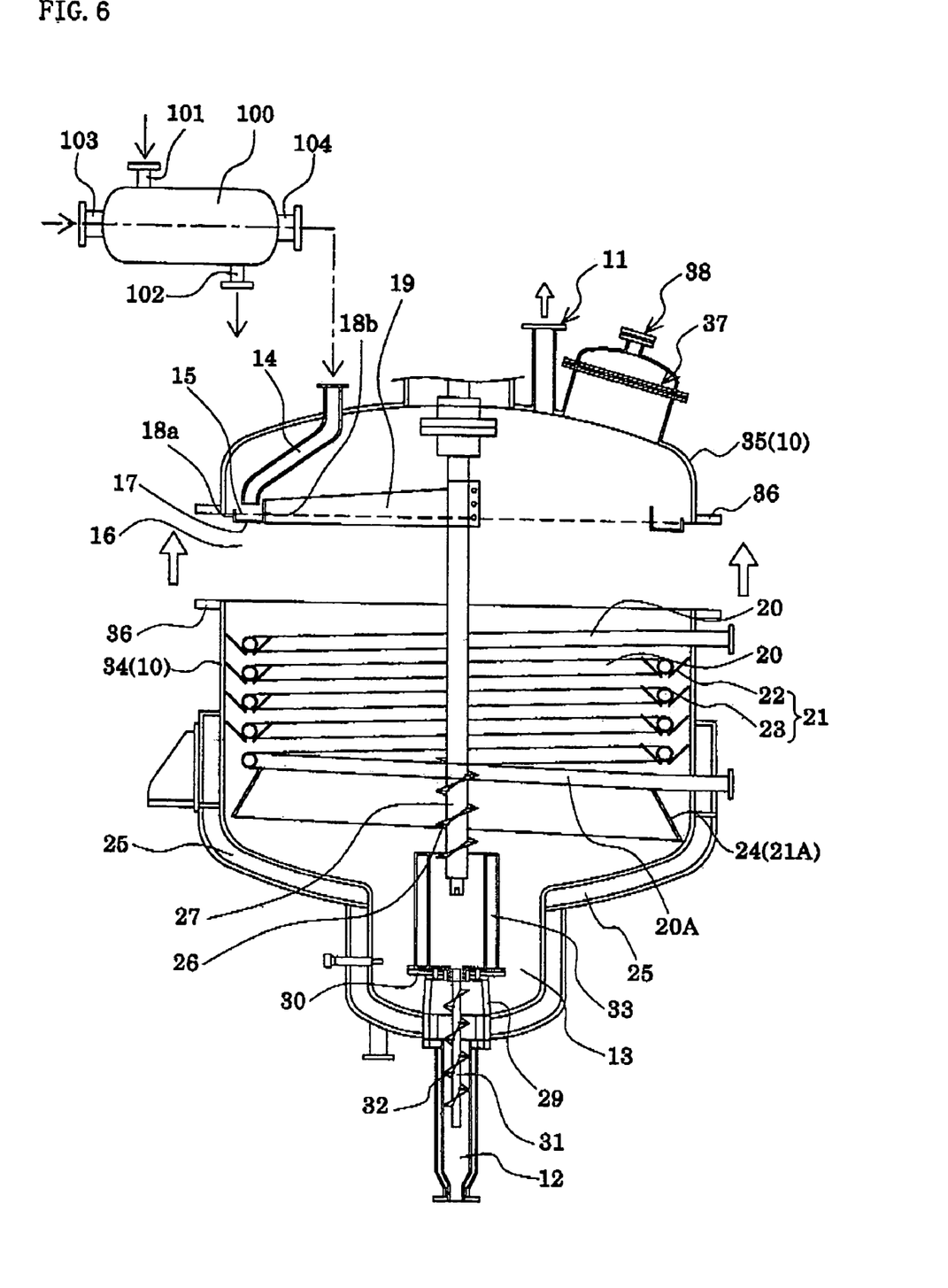
FIG. 6 is a schematic view of a separation/recovery apparatus according to Embodiment 1 of the present invention.

In the separation/recovery apparatus of the present invention, the apparatus main unit 10 is composed of a volume-reduced gel-state polystyrene resin receiving unit 34 and a lid 35 (see FIG. 2). The volume-reduced gel-state polystyrene resin receiving unit 34 and the lid 35 are bound together via flanges 36 through a binding means (not illustrated) such as bolts. Thus, as shown in FIG. 6, the volume-reduced gel-state polystyrene resin receiving unit 34 and the lid 35 can be readily separated, and a maintenance operation can be performed separately. In the maintenance operation, the space between the stirring rod 27 and the heating medium flow pipe 20 surrounding the rod can accommodate an operator, thereby facilitating the maintenance operation. The lid 35 has a manhole section 37, and the manhole section 37 has at the top thereof a window 38 through which the inside of the apparatus can be observed.

Embodiment 2

Figure 7:
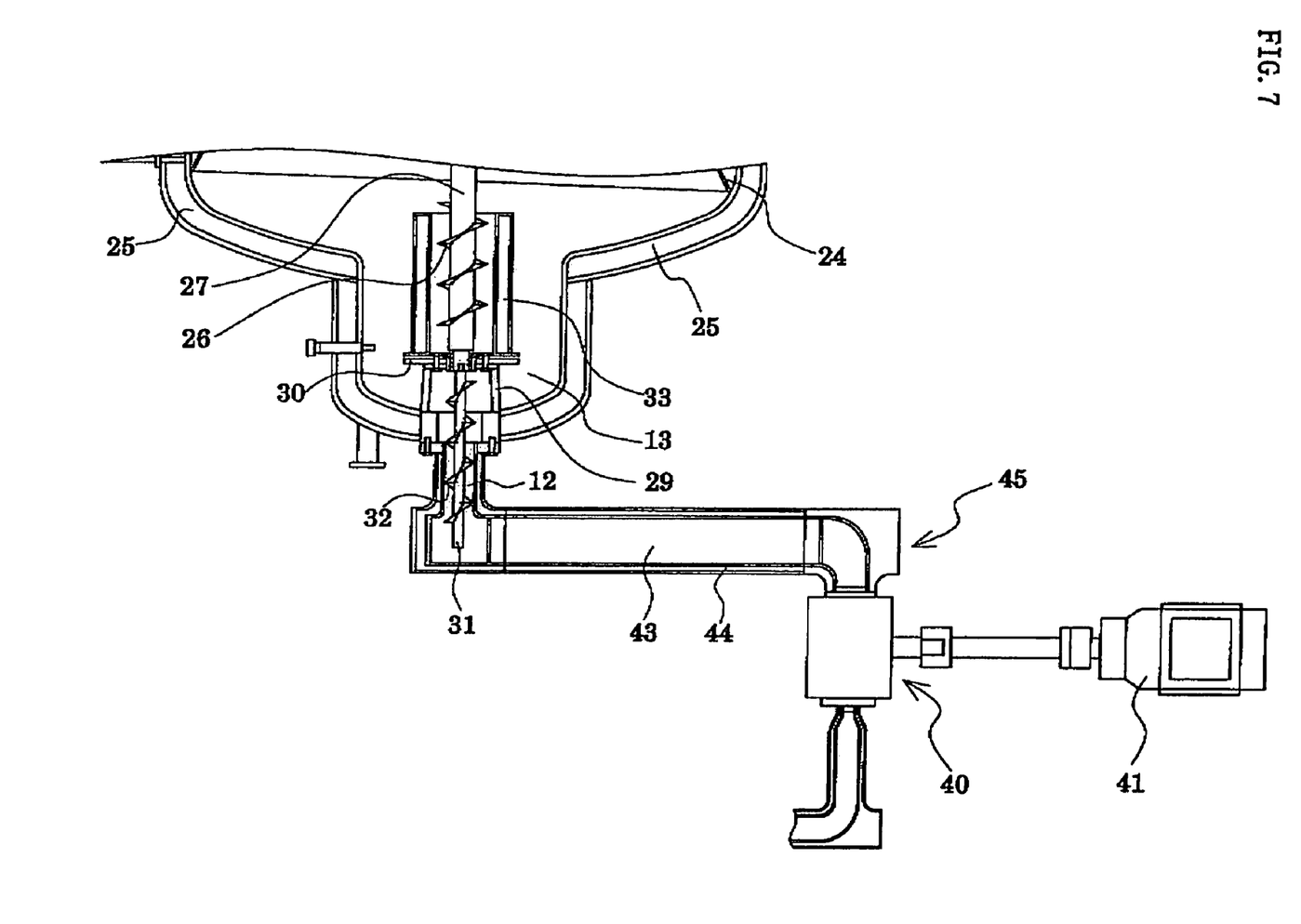
FIG. 7 is a schematic view of a separation/recovery apparatus according to Embodiment 2 of the present invention.

FIG. 7 is a schematic view of a portion of a separation/recovery apparatus according to Embodiment 2 of the present invention.

In Embodiment 1, the resin-recovering section 12 connected to the bottom of the apparatus main unit 10 extends along the axis of the stirring rod 27 serving as a stirring means. As shown in FIG. 7, the structural feature of Embodiment 2 is the same as that of Embodiment 1, except that a transfer pipe 43 is provided such that the pipe extends from the resin-recovering section 12 in a direction crossing the axis of the stirring rod 27 (e.g., a direction virtually normal to the horizontal direction). A heating medium circulation means 44 serving as a heating means is provided so as to surround the transfer pipe 43. Needless to say, similar to Embodiment 1, a discharge pump 40 is connected to a pump-connecting section 45 at an end of the transfer pipe 43.

Through employment of the structure, a stirring section including the protruding portion 32 of the second stirring rod 31 and the discharge pump 4b are disposed with an interval provided by the transfer pipe 43. Therefore, air bubbles incorporated into the resin can be remarkably reduced, leading to remarkable reduction of percent failure during extrusion molding.

The transfer pipe 43 is advantageous. For example, when a plurality of separation/recovery apparatuses are employed, a plurality of transfer pipes 43 are connected to a pump-connecting section 45, and resin fed from the separation/recovery apparatuses can be discharged by use of a single discharge pump 40.

INDUSTRIAL APPLICABILITY

As described hereinabove, the separation/recovery apparatus of the present invention continuously and efficiently treats volume-reduced polystyrene resin in gel state, thereby removing solvent and recovering resin.

The invention claimed is:

1. A separation/recovery apparatus for heating volume-reduced gel-state polystyrene resin under ambient pressure or reduced pressure, to thereby remove solvent and recover resin, characterized in that the apparatus comprises:

an apparatus main unit having at the top of the unit a solvent-recovering section for continuously recovering evaporated solvent and having at the bottom of the unit a resin-recovering section for recovering the solvent-removed resin;

a heating medium flow pipe which is provided inside the apparatus main unit such that the pipe forms a multi-layer structure in the vertical direction and which allows flow of a heating medium inside the pipe;

a gel-state resin-feeding means for feeding the volume-reduced gel-state polystyrene resin such that the resin is brought into contact with the heating medium flow pipe;

a resin-holding section provided in the bottom of the apparatus main unit for holding the resin which has flowed down to the resin-holding section after contact with the heating medium flow pipe;

a heating means for heating the resin held in the resin-holding section;

a stirring means for stirring the resin contained in the resin-holding section; and regulating plates for guiding flow of the volume-reduced gel-state polystyrene resin which flows while being in contact with the heating medium flow pipe, the regulating plates being provided in the vicinity of and along the heating medium flow pipe, with a predetermined spacing between the plates.

2. A separation/recovery apparatus according to claim 1, wherein the heating medium flow pipe is provided in a continuous helical manner in the apparatus main unit in the vicinity of the circumferential wall.

3. A separation/recovery apparatus according to claim 1, wherein the flow-regulating plates are provided in the lateral sides of the heating medium flow pipe with a predetermined spacing and are caused to be slanted to form a lower opening having a spacing narrower than that of an upper opening.

4. A separation/recovery apparatus according to claim 3, wherein the flow-regulating plates are provided so as to form a multi-layer structure in the vertical direction, the upper spacing increases in the vertical direction from the top to the bottom of the multi-layers, and the volume-reduced gel-state polystyrene resin spilling over the upper ends of the flow-regulating plates flows down to the flow-regulating plates of a lower layer.

5. A separation/recovery apparatus according to claim 1, comprising a flow-regulating plate provided along a lowermost layer of the heating medium flow pipe which guides the resin which has flowed down from the heating medium flow pipe to the wall of the apparatus main unit.

6. A separation/recovery apparatus according to claim 1, wherein the heating means includes a heating medium circulation means for circulating a heating medium over the wall of the lower section of the apparatus main unit.

7. A separation/recovery apparatus according to claim 6, wherein the heating medium circulation means is linked to the heating medium flow pipe, whereby the heating medium is continuously circulated throughout the heating medium circulation means and the heating medium flow pipe.

8. A separation/recovery apparatus according to claim 1, which comprises means for maintaining the inner surface of the resin-holding section at a temperature higher than the surface temperature of the heating medium circulating means.

9. A separation/recovery apparatus according to claim 1, wherein the heating means includes a heating medium circulation device which is in the general form of a hollow cylinder and which is provided surrounding the stirring means disposed substantially at the center of the bottom of the resin-holding section.

10. A separation/recovery apparatus according to claim 1, wherein the gel-state resin-feeding means includes a trough member which is provided above the heating medium flow pipe and which is rotatably operated, and a conduit for feeding the volume-reduced gel-state polystyrene resin onto the trough member, such that the volume-reduced gel-state polystyrene resin that has spilt over the trough member is caused to flow down to the heating medium flow pipe.

11. A separation/recovery apparatus according to claim 1, wherein the apparatus further includes a transfer pipe for transferring the resin discharged down from the resin-recovering section in a generally horizontal direction, and a discharge pump attached to the transfer pipe for recovering the resin.

12. A separation/recovery apparatus according to claim 11, wherein the apparatus further includes a heating means for heating around the transfer pipe.

* * * * *